(12) United States Patent
Benjamin et al.

(10) Patent No.: US 7,720,003 B2
(45) Date of Patent: May 18, 2010

(54) MODEL-BASED METHOD AND APPARATUS FOR DETERMINING MPLS NETWORK PROPERTIES

(75) Inventors: Shai Benjamin, Mevaseret Zion (IL); William Kuhhirte, Redington Shores, FL (US)

(73) Assignee: EMC Corporation, Hopkinton, MA (US)

( * ) Notice: Subject to any disclaimer, the term of this patent is extended or adjusted under 35 U.S.C. 154(b) by 1517 days.

(21) Appl. No.: 10/949,589

(22) Filed: Sep. 24, 2004

(65) Prior Publication Data

US 2005/0068953 A1 Mar. 31, 2005

Related U.S. Application Data

(60) Provisional application No. 60/505,802, filed on Sep. 25, 2003.

(51) Int. Cl.
*H04L 12/28* (2006.01)

(52) U.S. Cl. .................... 370/254; 370/395.1; 370/230; 709/223; 709/224

(58) Field of Classification Search ................ 370/230, 370/236, 230.1, 395.21, 395.31, 395.5, 395.51, 370/395.53, 395.52, 395, 5, 353, 397, 352, 370/254, 255, 256, 257, 258, 409, 410; 709/224, 709/221, 222, 223
See application file for complete search history.

(56) References Cited

U.S. PATENT DOCUMENTS

| | | | |
|---|---|---|---|
| 6,374,303 B1 * | 4/2002 | Armitage et al. | 709/242 |
| 6,874,022 B1 * | 3/2005 | Carew et al. | 709/224 |
| 6,990,518 B1 * | 1/2006 | Secer | 709/223 |
| 7,184,434 B2 * | 2/2007 | Ganti et al. | 370/389 |
| 2002/0186664 A1 * | 12/2002 | Gibson et al. | 370/254 |
| 2002/0191541 A1 | 12/2002 | Buchanan et al. | |
| 2004/0218535 A1 * | 11/2004 | Liong et al. | 370/238 |
| 2005/0091482 A1 * | 4/2005 | Gray et al. | 713/151 |
| 2007/0064704 A1 | 3/2007 | Balay et al. | |
| 2008/0127316 A1 | 5/2008 | Golan et al. | |

OTHER PUBLICATIONS

E.Rosen & Y. Rekhter, RFC 2547—BGP/MPLS VPNS, Internet Network Working Group, Mar. 1999.
E. Rosen, RFC 3031—Multiprotocol Label Switching Architecture, Internet Network Working Group, Jan. 2001.

\* cited by examiner

*Primary Examiner*—Jason E Mattis
*Assistant Examiner*—Dady Chery
(74) *Attorney, Agent, or Firm*—Krishnendu Gupta; Joseph D'Angelo (57) ABSTRACT

Embodiments of the present invention are directed to a method and apparatus for the identification or discovery for properties of MPLS networks through a modeling technique. Aspects of the present invention provide for discovering or identifying the Label Switched Paths in MPLS networks. The method comprises the steps of representing a network by a model comprising a plurality of configuration non-specific first object classes that are representations of types of components associated with the network components, and a plurality of configuration non-specific second object classes that are representations of relationships among the representation of types of component, identifying instances of a first one and a second one of the types of components object class, and identifying the label switch path by traversing the instances of the first and second types of components object classes through select ones of the relationship object classes associated with the first and second type of components object classes.

29 Claims, 8 Drawing Sheets

MODEL-BASED METHOD AND APPARATUS FOR DETERMINING MPLS NETWORK PROPERTIES

CLAIM OF PRIORITY

This application claims the benefit, pursuant to 35 §USC 119(e), of the earlier filing date of the Provisional Patent Application Ser. No. 60/505,802, entitled "Model-Based Discovery of Multi-Protocol Label Switching Virtual Private Networks, filed on Sep. 25, 2003, the contents of which are incorporated by reference herein.

RELATED APPLICATIONS

This application is related to concurrently-filed:
U.S. patent application Ser. No. 10/950,150, entitled "Model-Based Method and Apparatus for Determining Virtual Private Network Topologies;" and
U.S. patent application Ser. No. 10/949,415, entitled "Method and Apparatus for Modeling and Analyzing MPLS and Virtual Private Networks," the contents of both of which are incorporated by reference herein.

FIELD OF THE INVENTION

The invention relates generally to computer networks, and more specifically to a method and apparatus for identifying properties of Multi-Protocol Label Switching (MPLS) networks using a modeling technique.

BACKGROUND OF THE INVENTION

The concepts, terms, and acronyms of MPLS networks are well-known in the art. For example, the memorandum entitled *RFC* 3031-*Multiprotocol Label Switching Architecture*, E. Rosen, A. Viswanathan, and R. Callon, RFC 3031, January 2001, Internet Engineering Task Force (IETF), is an example of the literature regarding MPLS networks.

The ability to analyze MPLS networks has been limited by the network models that have been employed. For example, one model uses a Common Information Model (CIM) that defined objects and relationships. (see *Common Information Model: Implementing the Object Model for Enterprise Management*, Bumpus, et al., John Wiley & Sons, December 1999, ISBN: B00007FY8X). This model is limited by the pre-defined and standard objects and relationships defined in the Common Information Model (CIM). For example, one cannot easily capture the relationship between a Label-Switched Path (LSP) and LSPHop.

In a second model, the definition of MPLS Management Information Bases (MIBs) are established. (See, for example, *SNMP, SNMPv2, SNMPv3, and RMON* 1 *and* 2 (3rd Edition, William Stallings, Addison-Wesley Pub Co, December 1998, pages 71-162, ISBN: 0201485346). However, MIBs typically do not capture relationships between objects. For example the MPLS end-to-end Label-Switched Path (LSP) is difficult to represent explicitly in an MIB.

The lack of a systematic model specifically suited for the MPLS objects and relationships limits several forms of important analysis. Hence there is a need in the industry for a method and system that overcomes known deficiencies in identifying Label-Switched Paths in MPLS systems.

SUMMARY OF THE INVENTION

Embodiments of the present invention are directed to a method and apparatus for the identification or discovery for properties of MPLS networks through a modeling technique. Aspects of the present invention provide for discovering or identifying the Label Switched Paths in MPLS networks. The method comprises the steps of representing a network by a model comprising a plurality of configuration non-specific first object classes that are representations of types of components associated with the network components, and a plurality of configuration non-specific second object classes that are representations of relationships among the representation of types of component, identifying instances of a first one and a second one of the types of components object class, and identifying the label switch path by traversing the instances of the first and second types of components object classes through select ones of the relationship object classes associated with the first and second type of components object classes.

DETAILED DESCRIPTION OF THE FIGURES

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION

Figure 1A:
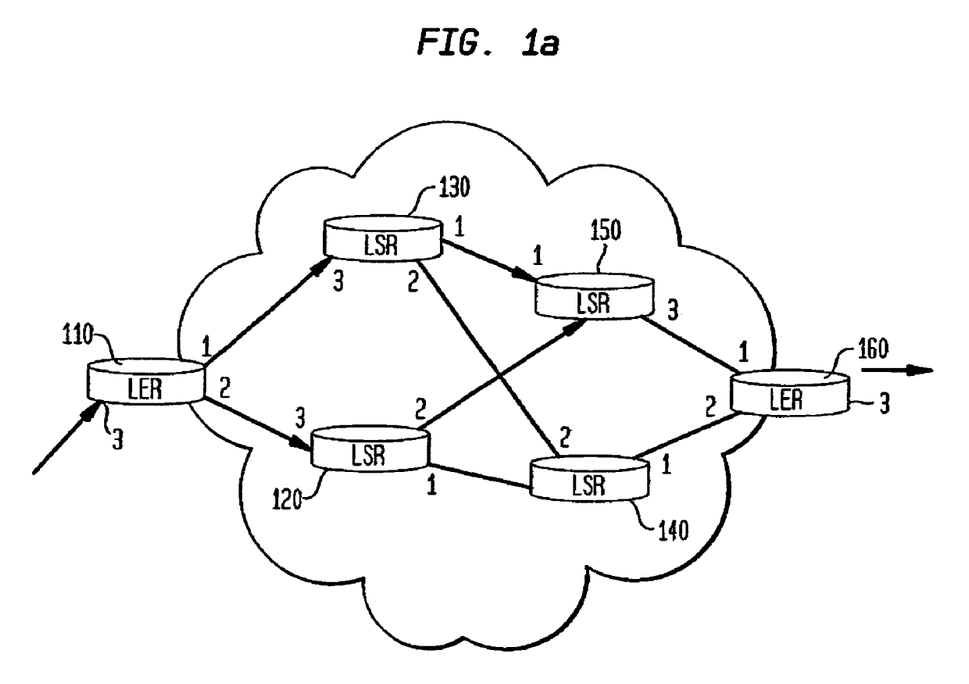
FIG. 1*a* illustrates an exemplary conventional MPLS network.

FIG. 1*a* illustrates a conventional MPLS network in an IP network. In this illustrated case, network 100 is composed of Label Edge Routers (LER) 110 and 160 and Label Switch Routers (LSR) 120, 130, 140 and 150. As shown, each router contains three ports for transmitting and/or receiving data or information items from connected routers. For example, LSR 120 is shown to receive data from LER 110 on its port 3 and transmit data to LSR 150 its port 2 and to LSR 140 via its port 1. Although LSR 120 is discussed and shown with regard to a unidirectional transmission, it would be recognized that the routers and the links between routers may be configured for bi-direction transmission and reception.

The Label Switch Routers, in this case, 120-150, represent the core MPLS nodes and contain forwarding tables that map the incoming label and incoming port information into an outgoing label and outgoing port. The incoming port is the identifier of the network interface at which the packet arrived while the outgoing port is the identifier of the network interface through which the packet will proceed to the next node.

The Label Switch Routers base their forwarding decisions on the MPLS label and incoming port combination, without referring at any Layer 2 or Layer 3 through 7 header (of the OSI stack). In some cases, only the MPLS label is used in making the forwarding decision. In such cases, incoming packets arriving on different incoming ports with the same label will be treated the same. Using a label swapping operation, the provider node replaces the MPLS label in the incoming packet with a new MPLS label in the outgoing packet and sends the new packet via the outgoing port. The path between one node and a second node is thus created by a sequence of MPLS labels and is referred to as a Label Switched Path (LSP).

The last router, i.e., Label Edge Router 160, in an LSP is a special case in that a new MPLS label need not be added to the address to forward the information. Thus, LER 160 removes the MPLS shim and sends the resulting packet via the designated outgoing port. This functionality is well-known in the art and referred to a penultimate hop popping or PHP.

Figure 1B:
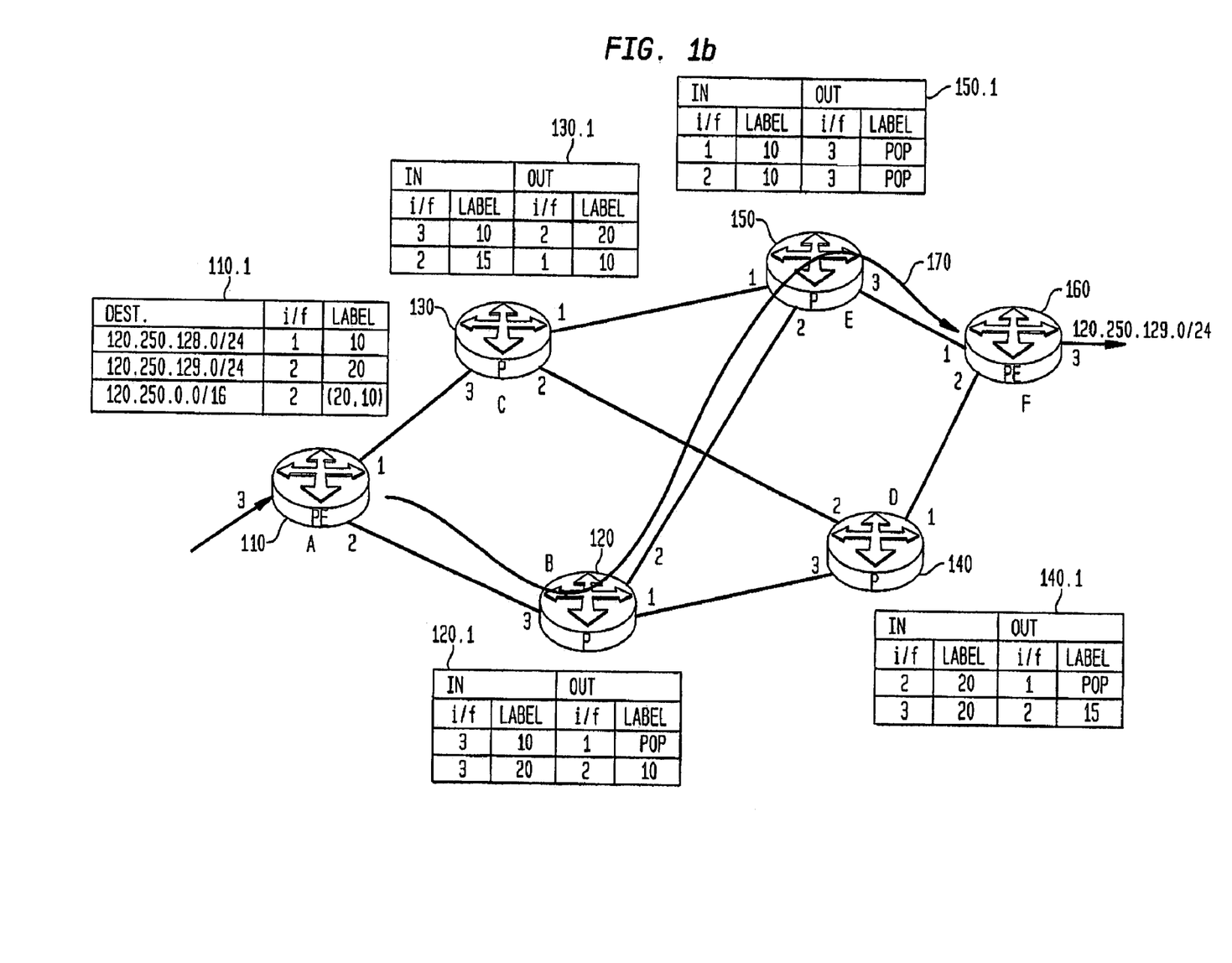
FIG. 1*b* illustrates exemplary routing and forwarding tables associated with the network shown in FIG. 1*a*.

FIG. 1b illustrates, for each router shown in FIG. 1a, exemplary forwarding table relationships between the input port/MPLS label and the outgoing port/MPLS label to use for selected destination IP addresses. In this case, the Label Switch Router selects an outgoing MPLS label based on the desired destination, inserts the outgoing MPLS label as a shim in a packet header and sends the information items via the designated outgoing port. For example, information associated with IP addresses 120.250.129.0/24 provided on LER 110 port 3 proceeds via LSP 170 through routers 110, 120, 150 and 160 based on the label binding routing tables 110.1, and label forwarding tables 120.1 and 150.1. The destination Label Edge Router 160 does not require a forwarding table to retrieve the desired destination address. One skilled in the art would recognize that table 150.1 includes a "pop" label for information received on port 1, label 10. Use of a "pop" label is well-known to indicate that the node applying the "pop" label is the penultimate node and information items are forwarded to the ultimate node via the specified outgoing port. Table 110.1 further illustrates the use of MPLS label stack in that labels 10 and 20 are assigned to information destined for IP addresses 120.250.0.0/16. The use of the MPLS label stack is well-known in the art and need not be discussed in detail herein.

Figure 2A:
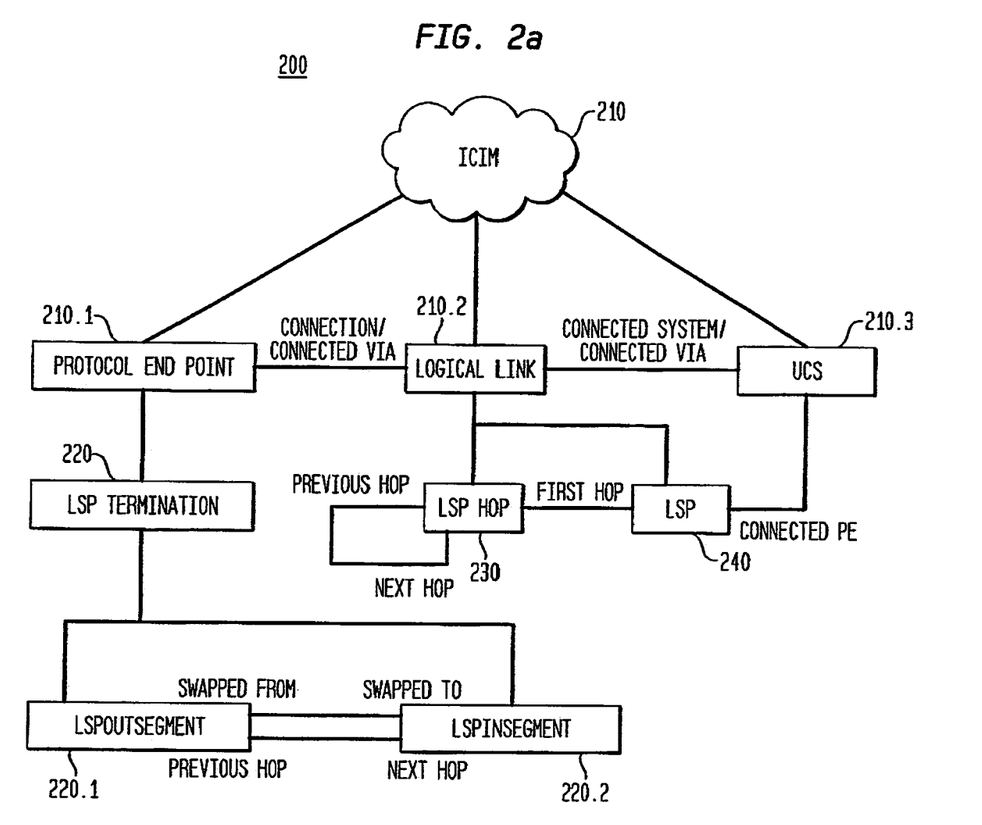
FIG. 2*a* illustrates a model representation of an MPLS network in accordance with the principles of the invention.

FIG. 2a illustrates an exemplary embodiment of an MPLS model to capture characteristics of the MPLS network. The MPLS model shown is an extension of known network models, such as the SMARTS® InCharge™ Common Information Model (ICIM), or similarly defined or pre-existing CIM-based model, that define object classes. SMARTS and InCharge are trademarks of System Management ARTs, Inc., having a principle place of business in White Plains, N.Y., USA. CIM models are known to represent selected ones of the physical network components, e.g., nodes, routers, computer systems, disk drives, etc., or logical network components, e.g., software, application software, ports, disk drive designation, etc., by defining object classes, which are a representation of the component. Those network components that are selected for representation in the model are hereinafter referred to as managed components. The representation of the managed components includes aspects or properties of the component. Similarly, the relationships between the managed components are also represented and contained in the model.

With regard to the ICIM, this model defines object classes such as ProtocolEndpoint 210.1, LogicalLink 210.2 and UCS 210.3 (Unitary Computer System) that are representative of generic concepts of protocol endpoint, logical link and unitary computer systems, respectively. Further, the Protocol Endpoint 210.1 and the Logical Link 210.2 are related in each direction by a ConnectedVia/ConnectedTo relationship.

In accordance with the principles of the invention with regard to modeling MPLS networks, additional object classes are defined as:

LSPTermination 220, which represents incoming or outgoing MPLS labels in the MPLS forwarding table;

LSPHop 230, which represents a unidirectional logical link between two devices or components in an MPLS network across which MPLS-labeled packets are sent; and LSP 240, which represents a concatenation of LSPHops which represents the label switched path taken by labeled packets across an MPLS network.

In additions, representations of the MPLS labels, may be defined as:

LSPInSegment 220.1; and

LSPOutSegment 220.2, wherein, these object classes represent the incoming and outgoing labels, respectively, in the MPLS forwarding/routing table and are subclasses of the LSPTermination 220 object class.

The LSPInSegment 220.1 and LSPOutSegment 220.2 objects are related by two pairs of relationships: PreviousHop/NextHop and SwappedFrom/SwappedTo, wherein relationship PreviousHop/NextHop relates two different LSPTerminations that are on opposite ends of an LSPHop and have the same label attribute. Relationship object class SwappedFrom/SwappedTo relates an LSPInSegment, representing an incoming label, with the LSPOutSegment, representing the outgoing label, which are swapped or changed to on the same device.

Base model UCS (Unitary Computer System) 210.2 object class that represents generic computer systems, such as nodes, servers, routers, etc. UCS 210.2 hosts LSPTermination points and are related to LSPs via the ConnectedPE relationship that define a LER or LSR, i.e., router, unitary computer system. The base model also defines the relationship ConnectedSystems/ConnectedVia between UCS and LogicalLink.

Figure 2B:
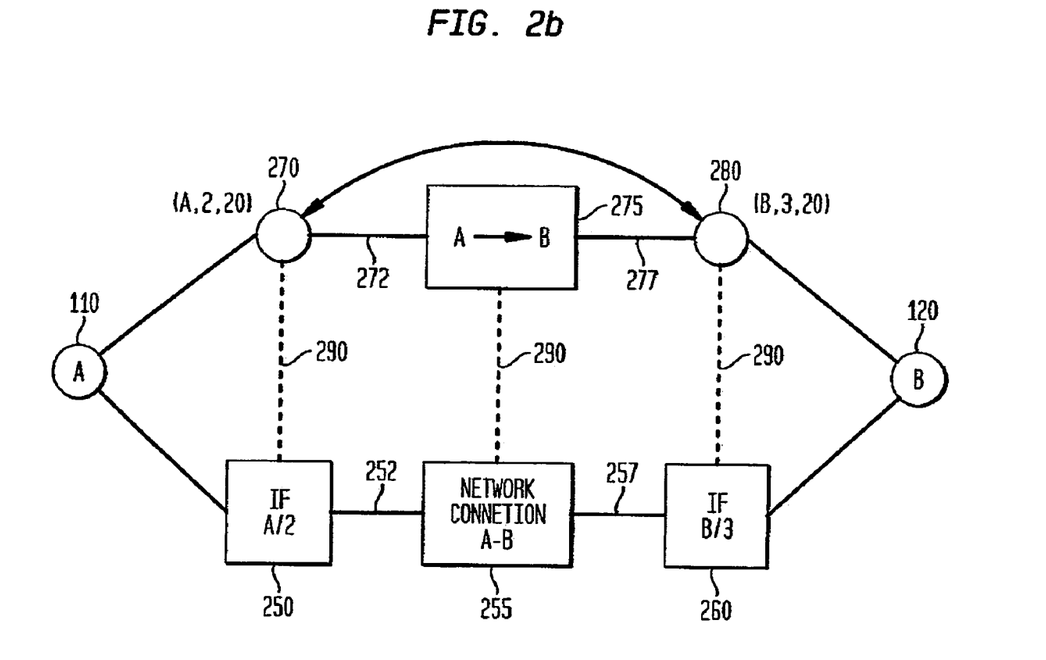
FIG. 2*b* illustrates an instantiation of the model with associated network elements.

FIG. 2b illustrates instances of object classes and their relationships with regard to the model representing the network. More specifically, and referring to FIG. 1b, node 110, identified as "A" includes an interface 250, which, in this case, is associated with outgoing port 2. Port 2 is connected via a medium, e.g., electrical, optical, wireless, etc., to a network connection 255 between nodes 110 and 120, identified as "B." Network connection 255, similarly may be a medium such as electrical, optical, wireless, etc. Network connection 255 is further connected, via medium 257 to interface 260, to port 3 of node 120.

Model representation of components may be "layered-over" corresponding components in the physical network, as represented by dotted lines 290. The model includes connector 270, which is representative of interface 250, and is shown to possess a ConnectedVia 272 relationship to logical link 275. Link 275 is representative of network connection 255 and further possess a ConnectedVia 277 relationship to connector 280, which is representative of interface 260.

Figure 3:
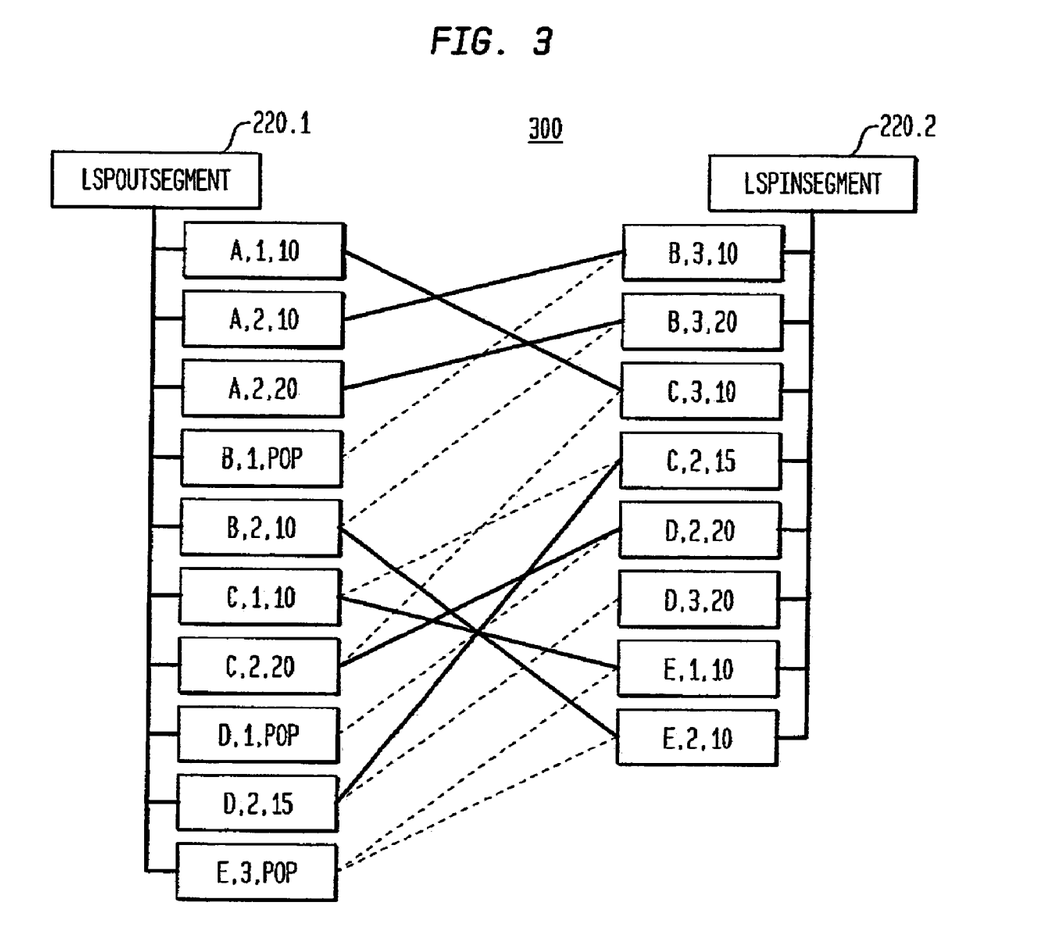
FIG. 3 illustrates the relationships between instances of the classes LSPInSegment and LSPOutSegment for the exemplary network shown in FIGS. 1*a* and 1*b*.

FIG. 3 illustrates instances of the classes LSPOutSegment 220.1 and LSPInSegment 220.2 with regard to the exemplary network shown in FIGS. 1a and 1b. With reference to table 110.1 (FIG. 1b), the instances of the object class may be determined. For example, with regard to the outgoing port 1 with label 10 of router 110, this instance possesses a PreviousHop/NextHop relationship with the input port 3 with label 10 of router 130, which is referred to as "B." To identify each instance in the referred too object classes, the labeling convention used herein is a triplet identifier as <node identifier>, <port>, <label>. Thus, an instance identified as (A,1,10) refers to node identified as A, port 1, label 10. Although the instances are shown and described with regard to a triplet identifier, in one aspect of the invention, the instance may be identified only with the node identification and the label. In this case, the doublet identification would represent the condition wherein information received on any input port is provided to the output port specified by the label.

In a similar manner, it may be shown that router 120, port 2, label 10 possesses a PreviousHop/NextHop relationship with the input port 2 of router 150, identified as "E." The PreviousHop/NextHop relationships are shown in FIG. 3 by the solid lines that connect the pairs of instances. Instance identification (B,2,10), further, possesses a SwappedFrom/SwappedTo relationship with router 120, port 3, label 20, i.e., instance (B,3,20). The SwappedFrom/SwappedTo relationship is shown in FIG. 3 by the dotted lines that connect the pairs of instances.

Figure 4A:
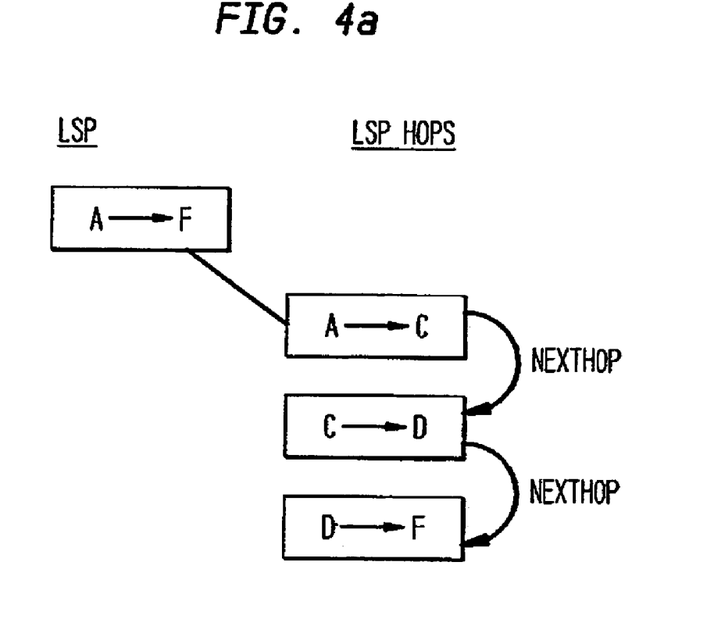
FIGS. 4*a*-4*d* illustrates instances of the classes LSP and LSPHop and the relationships between them in the exemplary network shown in FIG. 1*b*.
Figure 4B:
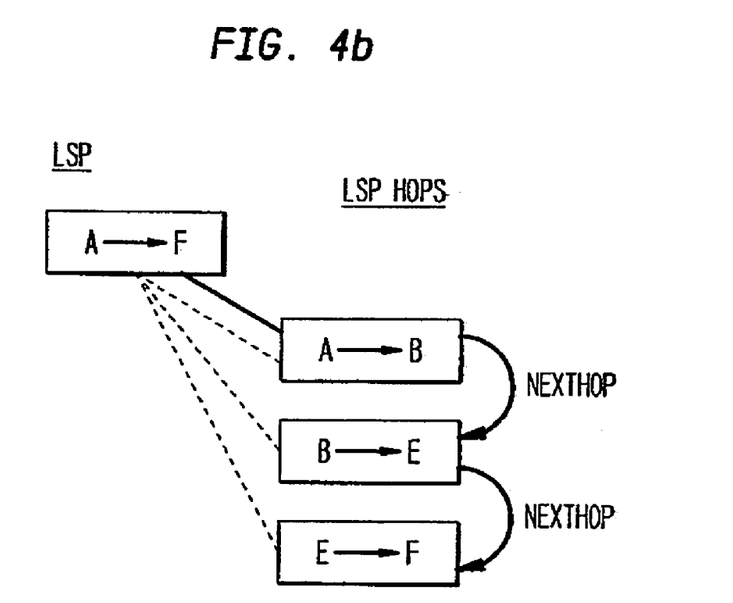
Figure 4C:
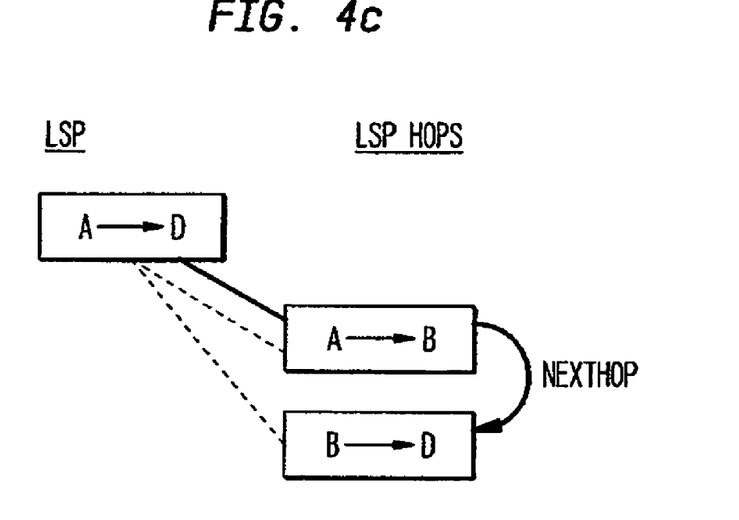
Figure 4D:
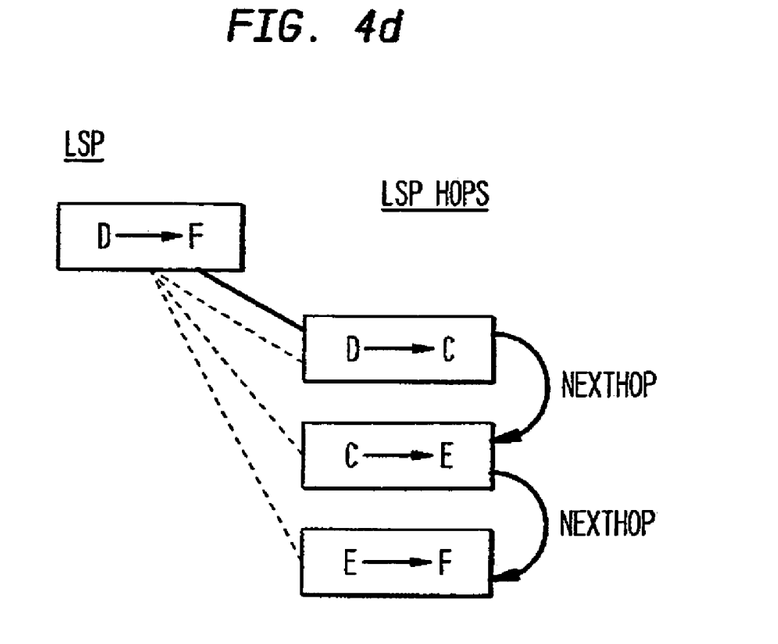

A determination of the LSPs in the exemplary network shown in FIG. 1b may now be performed based on the PreviousHop/NextHop and SwappedFrom/SwappedTo relationships shown in FIG. 3. More specifically, the LSPs may be determined by traversing the class instances through PreviousHop/NextHop and SwappedFrom/SwappedTo relationships. For example, beginning at LSPOutSegment instance (A,1,10), the PreviousHop/NextHop relationship transfers the information at router 110, port 1 with label 10 to node 130, i.e, instance (C, 3, 10). The MPLS identifier is swapped to instance (C,2,20) and the PreviousHop/NextHop relationship transfers data at route 130 to node 140, port 2, i.e., instance (D, 2, 20). At router 140 the MPLS identifier is swapped to instance (D, 1, pop), wherein "pop" is well-known to indicate the penultimate node and, thus, the data is further transferred to the node attached to the referred to outgoing port. i.e., node 160. FIG. 4a illustrates the logical paths associated with a discovered LSP between nodes A and F, i.e., routers 110 and 160, for the range of IP addresses 120.250.128.0/24. FIG. 4b, similarly, illustrates the logical hops between nodes A and F, for route 170 shown in FIG. 1. This LSP is similarly determined by traversing the PreviousHop/NextHop and SwappedTo relationships between instances of the LSPOutSegment and LSPInSegment object classes shown in FIG. 3. FIGS. 4c and 4d illustrates the logical paths associated with the remaining LSPs in the network shown in FIG. 1b.

Although not shown, the information to populate or determine instances of the object classes, i.e., representation of managed components, and the relationship between components, i.e., representation of managed component relationships, of the model defined herein may be pre-loaded, predetermined, imported, discovered or provided by one or more of the sources of information, such as Simple Network Management Protocol (SNMP) MIBs, MPLS-LSR-MIB, MPLS forwarding tables. Similarly, manual commands such as command Line Interface (CLI) at network devices, Show commands that retrieve and display information regarding forwarding-table may be used to provide information to populate or create instances of the object classes. Each of these sources of information are representative of communications that may occur dynamically over the physical network that the model overlays, i.e., layered over, and should not be considered the only method to dynamically populate the object classes shown.

Figure 5:
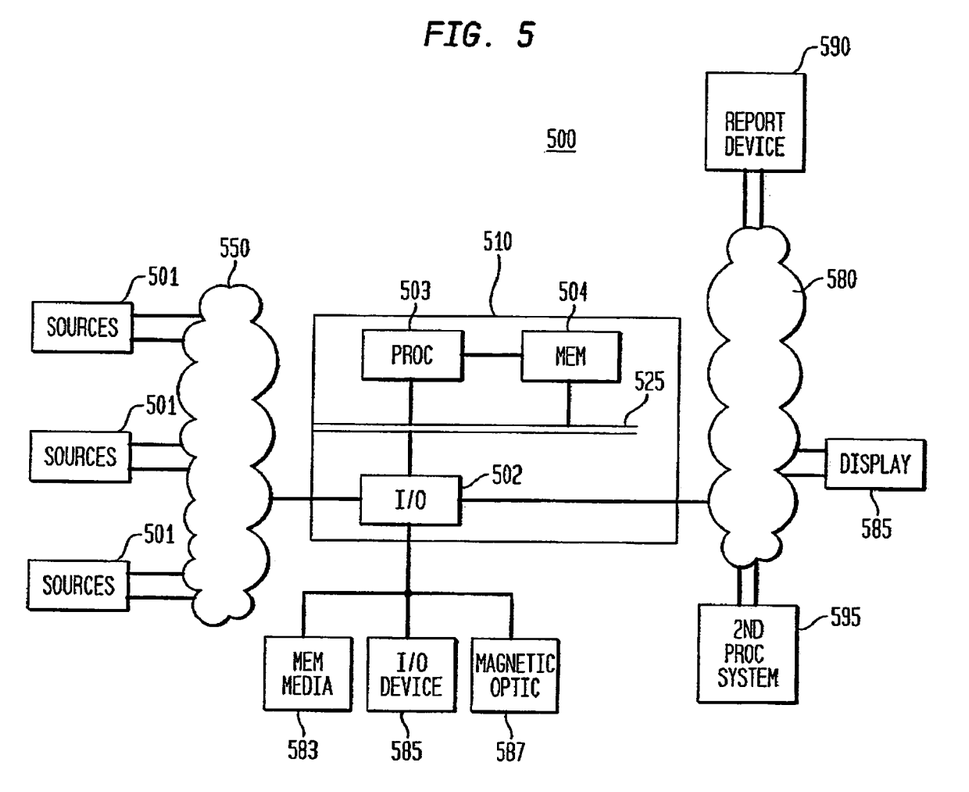
FIG. 5 illustrates a system for implementing the processing shown herein.

FIG. 5 illustrates an exemplary embodiment of an apparatus or system 500 that may be used for implementing the principles of the present invention. System 500 may contain one or more input/output devices 502, processors 503 and memories 504. I/O devices 502 may access or receive information from one or more sources or devices 501. Sources or devices 501 may be devices such as routers, servers, computers, notebook computer, PDAs, cells phones or other devices suitable for transmitting and receiving information responsive to the processes shown herein. Devices 501 may have access over one or more network connections 550 via, for example, a wireless wide area network, a wireless metropolitan area network, a wireless local area network, a terrestrial broadcast system (Radio, TV), a satellite network, a cell phone or a wireless telephone network, or similar wired networks, such as POTS, INTERNET, LAN, WAN and/or private networks, e.g., INTRANET, as well as portions or combinations of these and other types of networks.

Input/output devices 502, processors 503 and memories 504 may communicate over a communication medium 525. Communication medium 525 may represent, for example, a bus, a communication network, one or more internal connections of a circuit, circuit card or other apparatus, as well as portions and combinations of these and other communication media. Input data from the client devices 501 is processed in accordance with one or more programs that may be stored in memories 504 and executed by processors 503. Memories 504 may be any magnetic, optical or semiconductor medium that is loadable and retains information either permanently, e.g. PROM, or non-permanently, e.g., RAM. Processors 503 may be any means, such as general purpose or special purpose computing system, such as a laptop computer, desktop computer, a server, handheld computer, or may be a hardware configuration, such as dedicated logic circuit, or integrated circuit. Processors 503 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

In one aspect, the processes shown herein may be represented by computer readable code stored on a computer readable medium. The code may also be stored in the memory 504. The code may be read or downloaded from a memory medium 583, an I/O device 585 or magnetic or optical media, such as a floppy disk, a CD-ROM or a DVD, 587 and then stored in memory 504.

Information from device 501 received by I/O device 502, after processing in accordance with one or more software programs operable to perform the functions illustrated herein, may also be transmitted over network 580 to one or more output devices represented as display 585, reporting device 590 or second processing system 595.

As one skilled in the art would recognize, the term computer or computer system may represent one or more processing units in communication with one or more memory units and other devices, e.g., peripherals, connected electronically to and communicating with the at least one processing unit. Furthermore, the devices may be electronically connected to the one or more processing units via internal busses, e.g., ISA bus, microchannel bus, PCI bus, PCMCIA bus, etc., or one or more internal connections of a circuit, circuit card or other device, as well as portions and combinations of these and other communication media or an external network, e.g., the Internet and Intranet.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated. It is well within the knowledge of those skilled in the art to expand the teachings described herein to other networking technologies that have been contemplated and are considered within the scope of the invention. Similarly, the invention described herein describes a generic modeling approach for MPLS and is not limited by the model proposed or specific proposed modeling approach.

What is claimed is:

1. A method for identifying label switched paths in an MPLS network comprised of a plurality of component nodes, the nodes possessing an identification, at least one input port, at least one output port, and at least one forwarding table containing label swapping entries, the method comprising the steps of:
   a. representing, on one or more computers, the network by a model comprising:
      a. a plurality of configuration non-specific first object classes that are representations of types of components associated with the MPLS network; where the configuration non-specific representations of types of components is selected from the group consisting of: LSPTermination, LSPHop, LSP, LSPOutSegment, LSPInSegment; and
      b. a plurality of configuration non-specific second object classes that are representations of relationships among the representation of types of components associated with the MPLS network; wherein the configuration non-specific representation of relationships among the representation of types of components is selected from the group consisting of: PreviousHop/NextHop, SwitchedFrom/SwitchedTo, FirstHop, Connected PE;
   b. identifying instances of a first one and a second one of the types of components object class; and
   c. identifying the label switched paths by traversing the instances of the first and second types of components object classes through select ones of the relationship object classes associated with the first and second type of components object classes.

2. The method as recited in claim 1, wherein the instances of the first types of components class comprises
   component identification, output port and forwarding table label.

3. The method as recited in claim 1, wherein the instances of the second types of components class comprises:
   component identification and forwarding table labels.

4. The method as recited in claim 1, wherein the instances of the second types of components class comprises:
   component identification, input port and forwarding table label.

5. The method as recited in claim 1, further comprising the step of:
   storing a representation of the identified label switched paths.

6. The method as recited in claim 1, further comprising the step of:
   displaying the representation of the identified label switched paths.

7. The method as recited in claim 1, further comprising the step of:
   displaying details of the identified label switched paths.

8. The method as recited in claim 1, wherein the step of identifying instances is performed dynamically.

9. The method as recited in claim 1, wherein the object class instance identification is predetermined.

10. A apparatus for identifying label switched paths in an MPLS network comprised of a plurality of component nodes, said nodes having an identification, at least one input port, at least one output port, and at least one forwarding table containing label swapping entries, the apparatus comprising:
    a processor in communication with a memory, said processor executing code for:
       a. representing the network by a model comprising:
          a. a plurality of configuration non-specific first object classes that are representations of types of components associated with the MPLS network; where the configuration non-specific representations of types of components is selected from the group consisting of: LSPTermination, LSPHop, LSP, LSPOutSegment, LSPInSegment; and
          b. a plurality of configuration non-specific second object classes that are representations of relationships among the representation of types of components associated with the MPLS network: wherein the configuration non-specific representation of relationships among the representation of types of components is selected from the group consisting of: PreviousHop/NextHop, SwitchedFrom/SwitchedTo, FirstHop, Connected PE;
       b. identifying instances of a first one and a second one of the types of components object class; and
       c. identifying label switched paths by traversing the instances of the first and second types of components object classes through selected ones of the relationship object classes associated with the first and second types of components object classes.

11. The apparatus as recited in claim 10, wherein the instances of the first types of components class comprise:
    component identification, output port and forwarding table label.

12. The apparatus as recited in claim 10, wherein the instances of the second types of components class comprise:
    component identification and forwarding table labels.

13. The apparatus as recited in claim 10, wherein the instances of the second types of components class comprise:
    component identification, input port and forwarding table label.

14. The apparatus as recited in claim 10, the processor further executing code for:
    storing a representation of the identified label switched paths.

15. The apparatus as recited in claim 10, the processor further executing code for:
    displaying the representation of the identified label switched paths.

16. The apparatus as recited in claim 10, the processor further executing code for:
    displaying details of the identified label switched paths.

17. The apparatus as recited in claim 10, wherein the step of identifying instances is performed dynamically.

18. The apparatus as recited in claim 10, wherein the object class instance identification is predetermined.

19. The apparatus as recited in claim 10, further comprising:

an input/output device in communication with the processor and the memory.

20. The apparatus as recited in claim 10, wherein the code is stored in the memory.

21. A computer readable storage medium encoded with code thereon, the code suitable for identifying label switched paths in an MPLS network comprised of a plurality of component nodes, said nodes having an identification, at least one input port, at least one output port, and at least one forwarding table containing label swapping entries, the code providing instructions to a computing system for executing the steps of:

a. representing the network by a model including:

a plurality of configuration non-specific first object classes that are representations of types of components associated with the MPLS network; where the configuration non-specific representations of types of components is selected from the group consisting of:

LSPTermination, LSPHop, LSP, LSPOutSegment, LSPInSegment; and a plurality of configuration non-specific second object classes that are representations of relationships among the representation of types of components associated with the MPLS network; wherein the configuration non-specific representation of relationships among the representation of types of components is selected from the group consisting of: PreviousHop/NextHop, Switched From/SwitchedTo, FirstHop, Connected PE;

b. identifying instances of a first one and a second one of the types of components object class; and c. identifying the label switch path by traversing the instances of the first and second types of components object classes through select ones of the relationship object classes associated with the first and second type of components object classes.

22. The computer readable storage medium as recited in claim 21, wherein the instances of the first types of components class comprises component identification, output port and forwarding table label.

23. The computer readable storage medium as recited in claim 21, wherein the instances of the second types of components class comprises:

component identification and forwarding table labels.

24. The computer readable storage medium as recited in claim 21, wherein the instances of the second types of components class comprises:

component identification, input port and forwarding table label.

25. The computer readable storage medium as recited in claim 21, the code further providing instructions to a computing system for executing the steps of:

storing a representation of the identified label switched paths.

26. The computer readable storage medium as recited in claim 21, the code further providing instructions to a computing system for executing the steps of:

displaying the representation of the identified label switched paths.

27. The computer readable storage medium as recited in claim 21, the code further providing instructions to a computing system for executing the steps of:

displaying details of the identified label switched paths.

28. The computer readable storage medium as recited in claim 21, wherein the step of identifying instances is performed dynamically.

29. The computer readable storage medium as recited in claim 21, wherein the object class instance identification is predetermined.

* * * * *